US005838288A

United States Patent [19]

Lambert et al.

[11] Patent Number: 5,838,288

[45] Date of Patent: Nov. 17, 1998

[54] COLOR DISPLAY DEVICE HAVING COLOR SELECTION TIME DIVISIONS

[75] Inventors: Nicolaas Lambert; Edwin A. Montie, both of Eindhoven, Netherlands

[73] Assignee: U.S. Philips Corporation, New York, N.Y.

[21] Appl. No.: 524,980

[22] Filed: Sep. 7, 1995

[30] Foreign Application Priority Data

Sep. 7, 1994 [EP] European Pat. Off. .............. 94202569

[51] Int. Cl.$^6$ ................................ G09G 5/02; H04N 9/22

[52] U.S. Cl. ................................................ 345/74; 313/495

[58] Field of Search ................................ 345/74, 75, 102, 345/5, 88, 89, 101, 100, 146, 147, 150; 348/237, 656, 805, 761, 779, 797, 817, 657, 658, 809; 349/22; 313/495

[56] References Cited

U.S. PATENT DOCUMENTS

| | | | |
|---|---|---|---|
| 3,804,531 | 4/1974 | Kosaka et al. | 356/176 |
| 3,935,590 | 1/1976 | Kaji et al. | 348/656 |
| 4,490,739 | 12/1984 | Himuro et al. | 348/817 |
| 4,516,152 | 5/1985 | Willis | 348/657 |
| 4,679,065 | 7/1987 | Umezawa | 348/657 |
| 4,833,542 | 5/1989 | Hara et al. | 345/75 |
| 4,899,213 | 2/1990 | Konishi et al. | 348/237 |
| 4,914,510 | 4/1990 | Brennesholtz et al. | 348/779 |
| 5,028,849 | 7/1991 | Kawakami et al. | 315/368 |
| 5,157,308 | 10/1992 | Rindal | 348/805 |
| 5,402,143 | 3/1995 | Ge et al. | 345/5 |
| 5,499,040 | 3/1996 | McLaughlin et al. | 345/146 |
| 5,512,961 | 4/1996 | Cappels, Sr. | 348/658 |
| 5,654,607 | 8/1997 | Yamaguchi et al. | 313/495 |

FOREIGN PATENT DOCUMENTS

| | | | |
|---|---|---|---|
| 0400750 | 12/1990 | European Pat. Off. | H01J 31/12 |
| 0436997 | 7/1991 | European Pat. Off. | H01J 31/12 |
| 0550104 | 7/1993 | European Pat. Off. | H04N 9/12 |

*Primary Examiner*—Steven J. Saras
*Assistant Examiner*—John Suraci
*Attorney, Agent, or Firm*—Edward W. Goodman

[57] ABSTRACT

Color display device including a plurality of electron transport ducts for transporting electrons in the form of electron currents, and selection electrodes for extracting each electron current from its transport duct at predetermined locations and for directing them to different color pixels of a luminescent screen. The color selection time fractions during which the color pixels are activated are different for different color pixels in such a way that the color selection time fraction for the color pixel which requires the largest quantity of electrons for displaying maximum white is longer than the color selection time fraction of the color pixel which requires the smallest quantity of electrons for this purpose.

3 Claims, 5 Drawing Sheets

COLOR DISPLAY DEVICE HAVING COLOR SELECTION TIME DIVISIONS

BACKGROUND OF THE INVENTION

1. Field of the Invention

The invention relates to color display device provided with a luminescent screen having different color pixels, electron sources for generating electron currents modulated with video information, and a selection structure for sequentially directing each electron current to the different color pixels during color selection time fractions determined by color selection pulses applied to the selection structure.

2. Description of the Related Art

An example of such color display device is described in European Patent Application EP-A 0 550 104, corresponding to U.S. Pat. No. 5,525,873 (PHN 13.963) and may be provided with a display unit of the flat-panel type as disclosed in European Patent Applications EP-A 0 400 750, corresponding to U.S. Pat. No. 5,313,136, and EP-A 0 436 997, corresponding to U.S. Pat. No. 5,347,199. Display units of the flat-panel type are constructions having a transparent face plate and, arranged at a small distance therefrom, a rear plate, which plates are interconnected by means of side walls and in which the inner side of the face plate is provided with pixels in the form of a phosphor pattern, one side of which is provided with an electrically conducting coating (the combination also being referred to as luminescent screen). If (video information-controlled) electrons impinge upon the luminescent screen, a visual image is formed which is visible via the front side of the face plate. The face plate may be flat or, if desired, curved (for example, spherical or cylindrical).

The display unit described in U.S. patent Ser. No. 08/373,917 (PHN 13.963), comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents, first selection means with selectively energizable electrodes (preselection electrodes) for extracting each electron current from its transport duct at predetermined extraction locations facing the luminescent screen, and further selection means with selectively energizable electrodes (color selection electrodes) for directing electrons thus extracted towards different phosphor color pixels of the luminescent screen for producing a picture composed of pixels.

The operation of this known display unit is based on the recognition that electron transport is possible when electrons impinge on an inner wall of an elongate evacuated cavity (referred to as "compartment") defined by walls of a high-ohmic, electrically substantially insulating material (for example, glass or synthetic material), if an electric field of sufficient power is generated in the longitudinal direction of the "compartment" (by applying an electric potential difference across the ends of the "compartment"). The impinging electrons then generate secondary electrons by wall interaction, which electrons are attracted to a further wall section and in their turn generate secondary electrons again by wall interaction. The circumstances (field strength electrical resistance of the walls, secondary emission coefficient of the walls) may be chosen to be such that a substantially constant vacuum current will flow in the "compartment".

Starting from the above-mentioned principle, a flat-panel picture display unit can be realized by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By adding selection electrodes arranged in rows (the above-mentioned first selection means) to the arrangement of apertures, which selection electrodes are energizable by means of a first (positive) electric voltage (pulse) for extracting electron currents from the "compartments" via the apertures of a row, or which are energizable by means of a second (lower) electric voltage if no electrons are to be locally extracted from the "compartments", an addressing means is provided with which electrons extracted from the "compartments" can be directed towards the screen.

In order to build up a color picture by means of a luminescent screen comprising different color pixels, the electron current thus extracted from the transport ducts is subsequently successively directed towards the different color pixels of the luminescent screen via said further selection means. To this end, color selection pulses are applied to the further selection means in the known color display device so that the electron current extracted from the transport duct is directed towards, for example, the blue color pixel during a first color selection time fraction, towards the green color pixel during a second color selection time fraction and towards the red color pixel during a third color selection time fraction. Said color selection time fractions are mutually equal. The electron current applied via the transport duct and extracted therefrom by the first selection means is, of course, modulated with the blue video information during the first color selection time fraction, with the green video information during the second color selection time fraction and with the red video information during the third color selection time fraction.

One aspect in such a color display device is that the value of the electron current necessary to drive the color pixel so as to obtain maximum white (white having a maximum brightness) is different for the different color pixels. On the one hand, this results from the fact that the various primary colors (blue, green and red) contribute to a different extent to the perception of white light and, on the other hand, from the fact that the efficiency (lumens/watt) of the different phosphors is mutually unequal. In the known color display devices, this results in the fact that the available video drive range upon exciting one or more color pixels is not fully utilized.

SUMMARY OF THE INVENTION

It is an object of the invention to provide a solution in which, in spite of said differences in the electron current required for driving the different color pixels, a full or, in any case, improved utilization of the video drive range upon excitation of the color pixels is obtained, and to this end the color display device according to the invention is characterized in that the color selection time fractions for the different color pixels are mutually essentially different in such a way that the color selection time fraction for the color pixels which require the largest quantity of electrons for displaying maximum white is longer than the color selection time fraction for the color pixels which require the smallest quantity of electrons for displaying maximum white.

By extending the color selection time fraction for the color pixels requiring the largest quantity of electrons for displaying maximum white, the required current intensity of the electron current to these color pixels will become accordingly smaller. Due to this measure, there is less time available for the color selection of the color pixels which require fewer electrons for displaying maximum white and therefore the current intensity for these color pixels should be chosen to be higher. The maximum current intensities for driving the different color pixels thus tend towards each other due to the proposed measure and may be rendered, for example equal. Since the electron currents for the different color pixels are supplied by the same electron source, which supplies these currents sequentially, this electron source should be designed for the largest current to be supplied. Due to the proposed measure, the largest current to be supplied is decreased. The required video drive range is thus decreased (and better utilized) so that the electron sources can be controlled with video signals of a lower voltage. This results in a lower slew rate and consequently in less electromagnetic interference radiation (EMC) and possibly in a less expensive IC technology for the video modulators.

It is not always optimal to choose the color selection time fractions in such a way that the maximum current intensities for the different color pixels are equal because this may mean that the color selection time fractions will be in a mutual ratio of non-integral numbers, which leads to complicated implementations in practice. Preferably, a color device according to the invention is therefore further characterized in that the color selection time fractions for the different color pixels are in an integral ratio with respect to each other. The invention can then be simply implemented by generating clock pulses, whereby the color selection time fractions are derived from one or more clock pulse periods.

In color phosphors for the blue, green and red color pixels conventionally used in practice, a satisfactory approximation of mutually equal current intensities appears to be obtained if the color selection time fractions for the blue, green and red color pixels are in a ratio of 1:2:1. In this case, for example, the red and blue color selection time fractions are obtained with color selection pulses which are derived from a single clock pulse period, while the green color selection time fraction is obtained with color selection pulses derived from two clock pulse periods.

While the selection structure described hereinbefore comprises first selection means for extracting the electron currents from the transport ducts and further selection means for directing the extracted electrons towards the different color pixels, such a dual selection structure is not essential for use of the present invention. The invention may also be used to advantage in a single selection structure in which the electron currents for the different color pixels are separately extracted from the transport ducts and directed towards the relevant color pixel, or in a multiple, for example a threefold selection structure.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENT

Figure 1A:
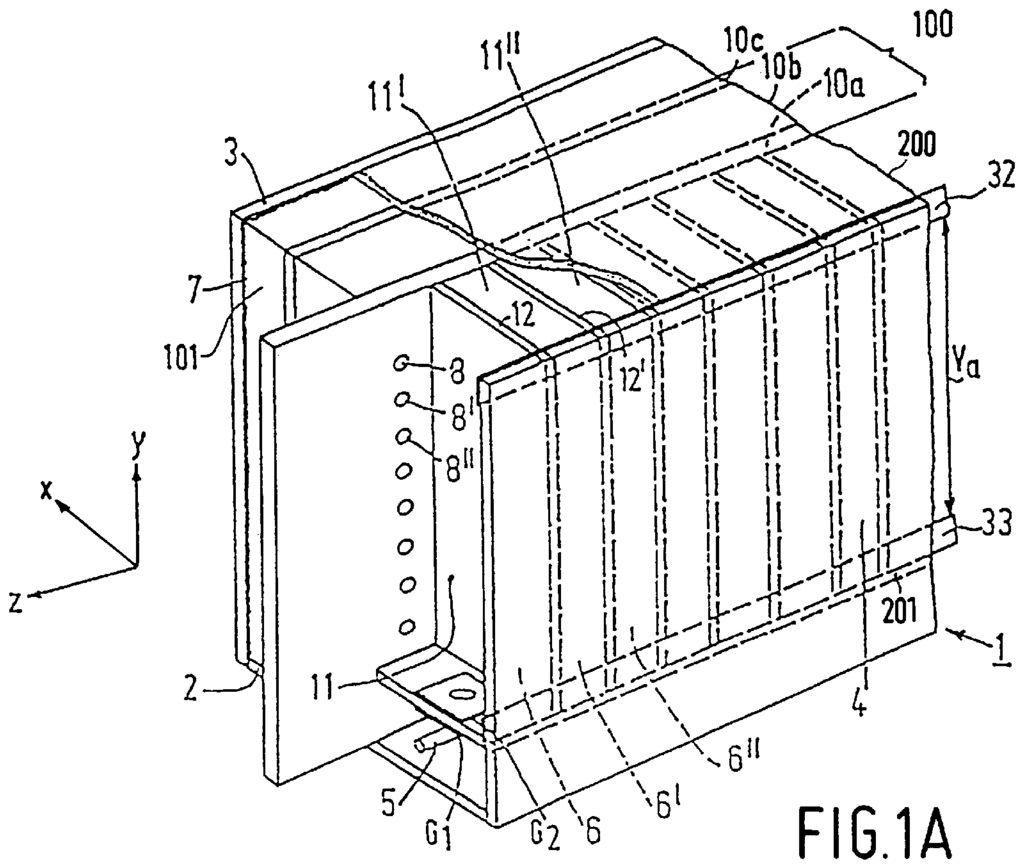
FIG. 1A is a diagrammatic perspective elevational view, partly broken away, of a display unit as can be used in a color display device according to the invention.
Figure 1B:
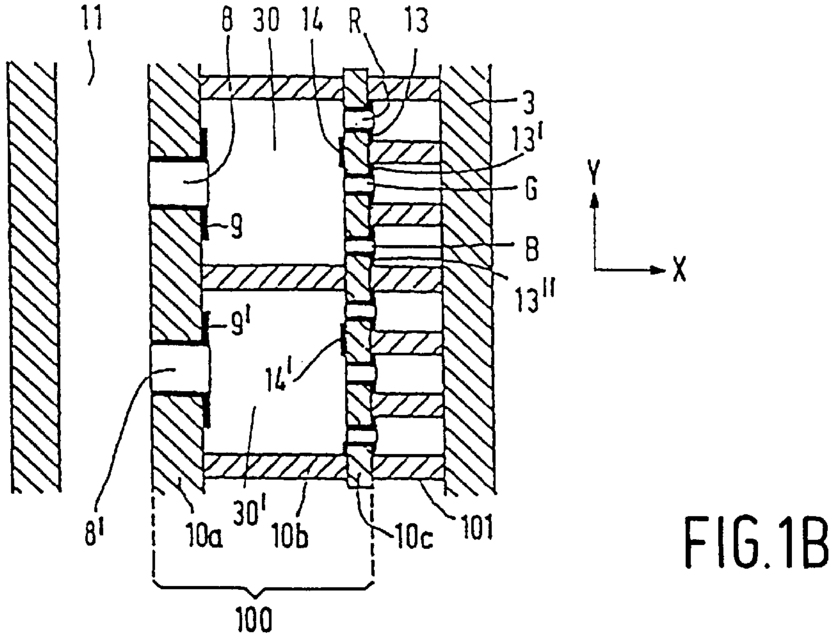
FIG. 1B is a cross-section through a display unit of FIG. 1A.

FIGS. 1A and 1B show a flat-panel display unit 1 which can be used in a color display device according to the invention. The display unit 1 comprises a display panel 3 consisting of a transparent front wall and a luminescent screen 7, and a rear wall 4 located opposite said display panel 3. The luminescent screen 7 having a repetitive pattern (rows or dots) of, for example, triplets of red (R), green (G) and blue (B) luminescing color pixels, is arranged on the inner surface of the display panel 3. To be able to supply the required high voltage, the luminescent screen 7 is either arranged on a transparent, electrically conducting layer (for example, indium-tin oxide) or is provided with an electrically conducting layer (for example, A1 backing). In a preferred embodiment, the (dot-shaped) phosphor elements of a triplet are located at the vertices of a substantially isosceles or equilateral triangle.

An electron source arrangement 5, for example, a line cathode which, by means of drive electrodes, provides a large number of (for example, several hundred) electron emitters or a similar number of separate emitters, is arranged proximate to a bottom plate 2 which interconnects display panel 3 and rear wall 4. Each of these emitters is to provide a relatively small current so that many types of cathodes (cold or hot cathodes) are suitable as emitters. The electron source arrangement 5 is arranged opposite entrance apertures of a row of electron transport ducts extending substantially parallel to the screen, which ducts are constituted by compartments 6, 6', 6", . . . etc., in this case one compartment for each electron source. These compartments have cavities 11, 11', 11", . . . defined by the rear wall 4 and partitions 12, 12', 12", . . . . At least one wall (preferably the rear wall) of each compartment is made of a material which has a suitable high electrical resistance in the longitudinal direction of the compartments (for example, ceramic material, glass, synthetic material—coated or uncoated—) and which have a secondary emission coefficient $\delta>1$ over a given range of primary electron energies. It is alternatively possible to construct (for example, the rear wall) from "isles" insulated from each other (in the longitudinal direction of the compartments) so as to obtain the desired high electrical resistance in the transport direction.

The electrical resistance of the wall material has such a value in the transport direction that a minimum possible total amount of current (preferably less than, for example 10 mA) will flow in the walls at a field strength in the axial direction in the compartments of the order of one hundred to several hundred volts per cm as required for the electron transport. A voltage which generates the field strength required for the transport is present in operation between an upper rim 200 and a lower rim 201 of the rear wall 4. The display unit utilizes the aspect disclosed in U.S. Pat. Nos. 5,313,136 and 5,347,199, that, in vacuum, electron transport by means of secondary emission (hopping) within compartments having walls of electrically insulating material is possible if an electric field of a sufficient value is applied in the longitudinal direction of the compartment. The contents of U.S. Pat. Nos. 5,313,136 and 5,347,199 are herein incorporated by reference.

By providing a voltage having a value of several dozen to several hundred volts (value of the voltage is dependent on the circumstances) between the row of electron sources 5 and at grids G1, G2 arranged at inputs of the compartments 6, 6', 6", . . . , electrons are introduced from the electron sources into the compartments. These electrons are accelerated by said field strength, whereafter they impinge upon the walls in the compartments and generate secondary electrons. The electrons can be extracted, for example, row by row from the compartments via apertures 8, 8', . . . in a selection plate 10*a* which are energized by means of electrodes 9, 9', . . . (see FIG. 1B) and accelerated towards the luminescent screen 7 by means of an acceleration voltage applied, in operation, between the selection plate and the luminescent screen.

FIGS. 1A and 1B further show the principle of stepped (multistage) selection. Stepped selection is herein understood to mean that the selection from the compartments 6, 6', 6", . . . to the luminescent screen 7 is realized in at least two steps, viz. a first (coarse) step for selecting, for example, the pixels (triplets) (preselection) and a second (fine) step to select, for example, the separate pixels (color selection). An active color selection structure 100 comprising the (active) preselection plate 10*a,* a spacer plate 10*b* and an (active) color selection plate 10*c* is arranged in the space between the compartments and the luminescent screen 7 which is arranged on the inner wall of the display panel 3. Structure 100 is separated from the luminescent screen 7 by a flu spacer structure 101, for example an apertured electrically insulating plate.

FIG. 1B shows, in a diagrammatic cross-section, a part of the color display device of FIG. 1A in greater detail, particularly, the active selection structure 100 comprising the preselection plate 10*a* with the extraction apertures 8, 8', 8", . . . and the color selection plate 10*c* with apertures for the various colors R, G and B. The apertures of the color selection plate 10*c* are generally positioned in a triangle but, for the sake of clarity, all three of them are shown in the cross-section of FIG. 1B. Three color selection apertures are associated with each extraction aperture 8, 8', etc. in this case. Other numbers are alternatively possible, for example, 6 color selection apertures per preselection aperture, etc. The spacer plate 10*b* is arranged between the preselection plate 10*a* and the color selection plate 10*c*. This spacer plate is provided with communication ducts 30, 30', 30", . . . having a cross-section chosen to match the shape of the phosphor color pixels (for example, circular or triangular triplets).

To be able to extract the electrons from the transport ducts 6, 6', 6", . . . via the apertures 8, 8', 8", . . . , the pierced metal preselection electrodes 9, 9', 9", . . . are arranged on the screen-sided surface of the plate 10*a*.

The walls of the apertures 8, 8', . . . are preferably metallized completely or partly, but there is preferably little or no electrode metal on the surface of the plate 10*a* at the side where the electrons land. This is to ensure that substantially no electrons are left on a selection electrode during addressing (i.e., the electrode must draw a minimal current).

Another solution to the problem of drawing current is to ensure that there is electrode metal on the selection surface where the electrons land, but this metal should then be given such a large secondary emission coefficient that the preselection electrodes do not draw any net current.

Similarly, as the plate 10*a* of (color) selection electrodes 13, 13', . . . , the screen-sided surface of the color selection plate 10*c* is provided to realize color selection. Here again, the apertures are preferably metallized completely or partly. As will be described in greater detail, it will then be possible to electrically interconnect color selection electrodes. In fact, a preselection per pixel has already taken place and the electrons cannot land on a pixel associated with another preselection electrode. This means that minimally only one group of three separately formed color selection electrodes 13, 13', 13" is required.

The drive is effected, for example, as follows, but other schemes are alternatively possible. The preselection electrodes 9, 9', 9", . . . are brought to a potential which increases substantially linearly with the distance to the electron source arrangement 5, for example by means of a suitable resistance ladder. One or more picture lines are sequentially selected by applying a positive voltage pulse of, for example 250 V to the desired preselection electrodes used for selecting these picture lines. During the selection period of a picture line (for example, 60 $\mu$sec), all pixels of said picture line are driven because, in fact, all transport ducts (compartments) 6, 6', 6" . . . convey current simultaneously. The different color pixels are sequentially addressed by applying shorter pulses (of, for example 20 $\mu$sec) with an amplitude of, for example, 350 V to the color selection electrodes 13, 13', 13". All corresponding color pixels of a picture line are thus driven simultaneously and the different color pixels of the picture line are driven sequentially. The selection electrodes preferably have such an electrical resistance, or are connected to external resistors in such a way that they safeguard the electronics (controlling the drive) from breakdown from the luminescent screen.

Figure 2:
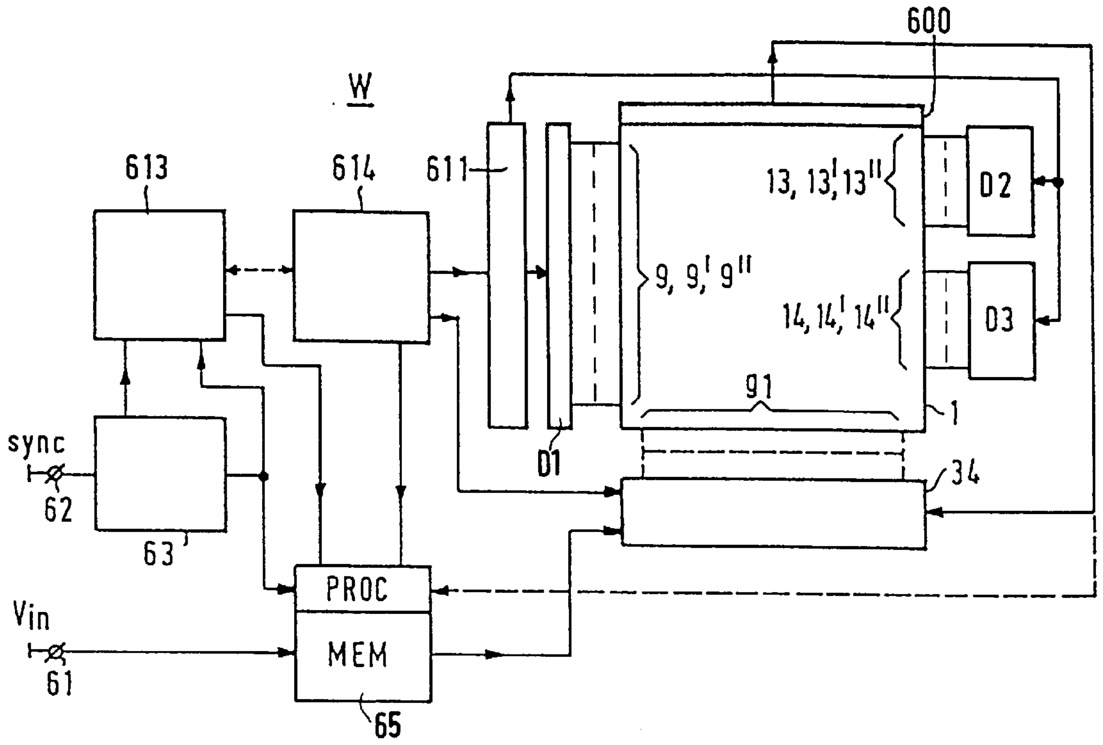
FIG. 2 is a block diagram of an embodiment of a color display device in which the invention can be used.

FIG. 2 shows, in a block diagram, an example of color display device with the described display unit. An input 61 of the color display device receives an input video signal Vin. The input video signal Vin is applied to a video signal processing circuit 65. An input 62 of the color display device receives a synchronizing signal sync. The input 62 is connected to a synchronization processing circuit 63. This synchronization processing circuit applies synchronizing signals to a clock generator 613 and defines the television standard of the incoming video signal. The incoming video signal may comprise, for example, Y, U, V signals (or R, G, B signals). If the incoming video signal comprises Y, U, V signals, a conversion to R, G, B signals will have to take place in the video signal processing circuit 65 so as to ultimately drive the different phosphors (red, green and blue) on the display panel 3. This conversion from Y, U, V signals to R, G, B signals may be effected by means of a matrix circuit. It is alternatively possible to perform this conversion before the video signal is written into the memory MEM or when the video signal is read from the memory MEM. In the video signal processing circuit 65, the video signal is stored, for example, line by line under the control of a read clock, for example, generated by the clock generator 613. The video signal is supplied line by line, for example, per color line at an output of the video signal processing circuit under the control of a read clock which is generated by a clock generator 614 and applied to the video drive circuit 34. In this video drive circuit, the video information of a color line is written under the control of the clock generator 614 and subsequently applied in parallel to the G1 (or G2) electrodes which are present at the inputs of the compartments 6, 6', 6", . . . (see FIG. 1) of the display unit 1 and after which the video information is displayed on the display panel 3. The lines are selected by means of a selection controller 611. This controller is controlled by a clock signal from the clock generator 614. After each clock pulse, a preselection driver D1 sends new drive voltages to the preselection electrodes 9, 9', 9", . . . under the control of the selection controller 611

(see also FIG. 1). If the color display device has a stepped selection, the selection controller 611 also controls a driver D2 for the color selection. This color selection driver D2 is then coupled to the color selection electrodes 13, 13', 13", . . .. Moreover, the selection controller 611 will also drive a dummy electrode driver D3 if the color display device comprises dummy electrodes 14, 14', 14" . . . (to enhance the contrast). This dummy electrode driver drives the dummy electrodes 14, 14', 14", . . . . The selection controller obtains the information about the drive voltages, for example, from a look-up table or from an EPROM. The display unit 1 is constructed, for example in the way as described in FIGS. 1A and 1B.

With reference to the incoming video signal, the synchronization processing circuit 63 determines the line frequency, the field frequency and, for example, also the TV standard and the aspect ratio if the color display device is suitable for displaying video signals of different TV standards and/or different aspect ratios.

The preselection electrodes 9, 9', 9", . . . must be driven with suitable voltages by means of the preselection driver D1. These voltages may be subdivided into a bias voltage and a selection pulse. The bias voltage is used for transporting the electrons in the transport ducts along the non-selected preselection electrodes. Successive preselection electrodes may have a bias voltage which increases with the position along the length of the transport ducts. The preselection pulse is a pulse of, for example 300 volt pulse height which is superimposed on the bias voltage for the selection electrode whose turn it is to extract electrons from the transport ducts. Examples of selection drivers realizing these functions are described in the prior European Patent Application 94200516.6, corresponding to U.S. patent application Ser. No. 08/249,426, filed May 26, 1994 (PHN 14.758) and 94200824.4, corresponding to U.S. patent application Ser. No. 08/249,417, filed May 26, 1994 (PHN 14.787) in the name of the Applicant.

Figure 3A:
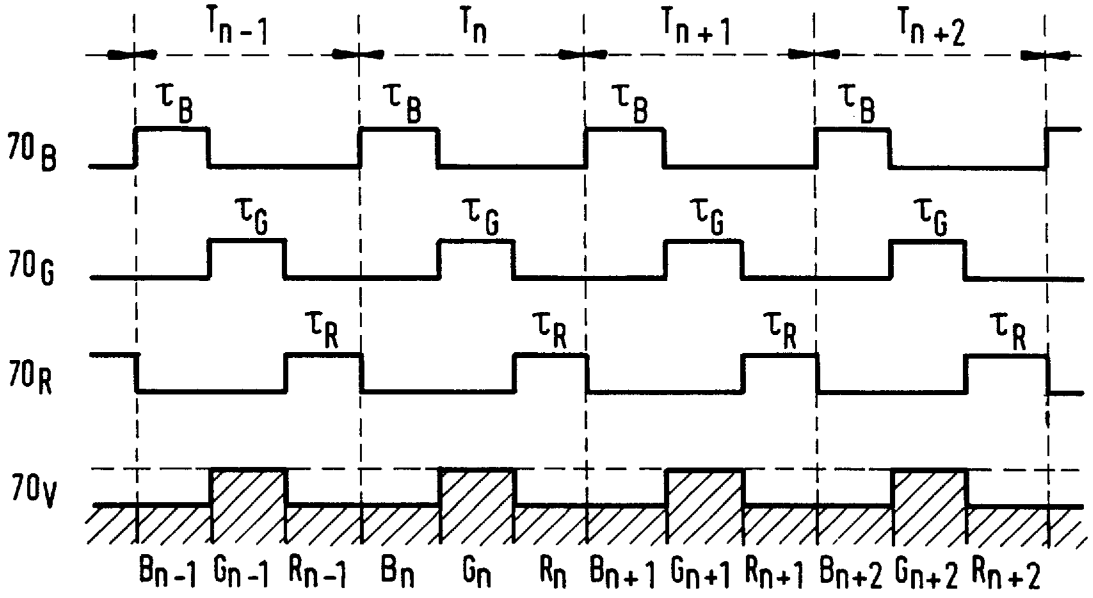
FIGS. 3A and 3B show time diagrams of color selection pulses and video signals in a conventional device and in a device according to the invention.

The time diagrams of FIG. 3A show the mutual relation between the preselection by means of the preselection electrodes 9, 9', 9", . . . , the color selection by means of the color selection electrodes 13, 13', and 13" and the video signal drive at the G1 electrodes. For the sake of clarity, this Figure, likewise as the following FIGS. 3B, 5A and 5B, does not take the inevitably finite edge steepness of the shown pulses into account.

The references $T_{n-1}$, $T_n$, $T_{n+1}$, etc., show a number of successive preselection periods. During the preselection period $T_n$, a preselection pulse is given at the preselection electrode having ordinal number n, during the subsequent preselection period $T_{n+1}$, a preselection pulse is given at the electrode having ordinal number n+1, and so forth. As described in European Patent Application 94201031.5, corresponding to U.S. patent application Ser. No. 08/423,241, filed Apr. 13, 1995 (PHN 14.813) in the name of the Applicant, the preselection pulses may partially overlap each other.

The references 70$B_B$, 70$_G$ and 70$_R$ denote time diagrams which show the color selection pulses at the blue (13"), the green (13') and the red (13) color selection electrodes, respectively. It has been assumed that all the blue color selection electrodes 13", as well as all the green color selection electrodes 13' and all the red color selection electrodes 13 are interconnected. It is apparent from FIG. 3A that each preselection period T is divided into three equal color selection time fractions $\tau_B$, $\tau_G$, $\tau_R$, which the blue color selection electrodes are selected during the first color selection time fraction $\tau_B$, the green color selection electrodes are selected during the second color selection time fraction $\tau_G$, and the red color selection electrodes are selected during the third color selection time fraction $\tau_R$.

Moreover, FIG. 3A diagrammatically shows, by means of time diagram 70$_V$, the video signal which is applied to the G1 electrodes and with which the electron currents in the electron transport ducts are modulated. During the blue color selection time fraction $\tau_B$ of the preselection period $T_{n-1}$, the electron currents are modulated with the video signal $B_{n-1}$, during the subsequent green color selection time fraction $\tau_G$, the electron currents are modulated with the video signal $G_{n-1}$, and during the subsequent red color selection time fraction $\tau_R$, the electron currents are modulated with the video signal $R_{n-1}$. Subsequently, the electron currents are successively modulated with the video signals $B_n$, $G_n$, $R_n$, then with the video signals $B_{n+1}$, $G_{n+1}$, $R_{n+1}$, and so forth.

The shaded area in the time diagram of the video signals shows that for obtaining maximum white in the displayed picture, the green color pixels must be driven with a higher electron current than the blue and red color pixels. This is caused by the fact that the different colors contribute to a different extent to the perception of white light by the human eye, with the green color giving the largest contribution to this perception. Moreover, this is caused by the different efficiency of the color phosphors in which, for the conventional phosphors, the red and green phosphors are essentially more efficient than the blue phosphor.

Curve 70$_V$ shows that the video drive range of the video output stages is fully used during the green color selection time fractions but only partly used during the blue and red color selection time fractions. In other words, the video output stages present in the video drive circuit 34 and modulating the electron currents in the electron transport ducts should be capable of driving the large electron current during the green color selection time fraction, but they are actually overdimensioned for the smaller modulation of the electron currents during the blue and red color selection time fractions.

Figure 3B:
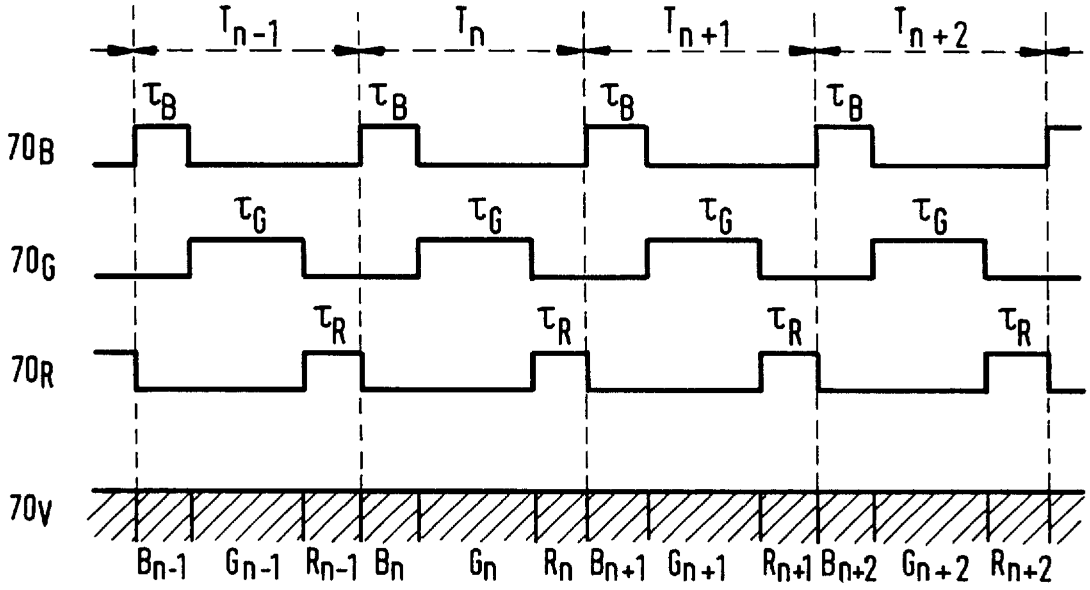

FIG. 3B shows a situation which is considerably more favourable in this respect. This Figure shows similar curves as FIG. 3A denoted by the same reference numerals 70$_B$, 70$_G$, 70$_R$, 70$_V$, but the green color selection time fraction is now twice as long as the red and the blue one. Thus, while in FIG. 3A the three color selection time fractions have an equally long duration and (apart from the edge periods) each cover a third of the preselection period T, the red and blue color selection time fractions each cover a quarter of the preselection period T and the green color selection time fraction covers half the preselection period T in FIG. 3B (again apart from the edge periods). By reducing the blue and red color selection time fractions, the electron current required during these periods will be larger, but the extension of the green color selection time fraction which is thereby possible causes such a reduction of the electron current flowing during this period that the maximum electron currents for the three colors are (approximately) equal to each other. The maximum electron current may now be ⅔ of that in the situation of FIG. 3A. Due to non-linearity in the current/voltage characteristic of the display panel, the maximally required video drive voltage decreases to a lesser extent, but nevertheless the gain is still considerable in view of the limitations with respect to voltage in the conventional inexpensive IC processes.

For optimally utilizing the video drive range of the video output stages in the video drive circuit 34, the mutual ratio of the three color selection time fractions $\tau_B$, $\tau_G$, $\tau_R$ should be chosen to be equal to the mutual ratio of the electron currents required for obtaining maximum white at mutually equal color selection time fractions. However, for a simple implementation, it will be preferred, in practice, to approximate the optimum mutual ratio of the color selection time fractions with a ratio of integral (a numbers p:q:r because the color selection time fractions can then be more easily derived from one or more periods of a clock pulse sequence supplied by a clock pulse generator. In the embodiment of FIG. 3B, the mutual ratio $\tau_B$:$\tau_G$:$\tau_R$ of the color selection time fractions is 1:2:1.

FIGS. 3A and 3B, curves $\mathbf{70}_V$ show the case where the electron currents are modulated in amplitude with the video signal. However, this is not necessary. The electron current may also be modulated in time (or in a mixed form of amplitude and time modulation as described in U.S. patent application Ser. No. 08/387,739, filed Feb. 16, 1995 (PHN 14.475) in the name of the Applicant). The additional advantage of time modulation is that there will be more intensity levels in green at an equal time resolution. This is an advantage because green is most important for the intensity perception.

In the foregoing it has been assumed that all blue color selection electrodes 13" are interconnected and thus constitute a single connection to the drive electronics (the color selection driver D2). The same applies to the green color selection electrodes 13' and the red color selection electrodes 13. Three color selection pulse output stages are thus required in the driver D2, one for blue, one for green and one for red. However, this configuration implies that very large currents must be supplied by said output stages so as to charge and discharge the (parasitic) capacitances of the color selection electrodes. This is a result of the fact that each color selection pulse is applied to all color selection electrodes for the relevant color, also to all those color selection electrodes which are actually inactive because the corresponding preselection electrodes are not energized at that instant.

A configuration which is much more favorable in this respect is the one in which each color selection electrode is separately connected to the driver D2 and is only energized if also the corresponding preselection electrode is active for extracting electrons from the electron transport ducts. However, this has the result that 3*384=1152 connections to the color selection driver D2 must be made in a display panel of, for example, 384 horizontal lines, and that this driver must comprise 1152 output stages to be driven separately.

In practice, a configuration is preferred which is actually a compromise between the configuration in which there are no through-connections between they color selection electrodes and the configuration in which all color selection electrodes of one and the same color are interconnected. This will be further described with reference to FIGS. 4 and 5 which also show that it is possible to use the same color selection electrode for selecting different color pixels.

Figure 4:
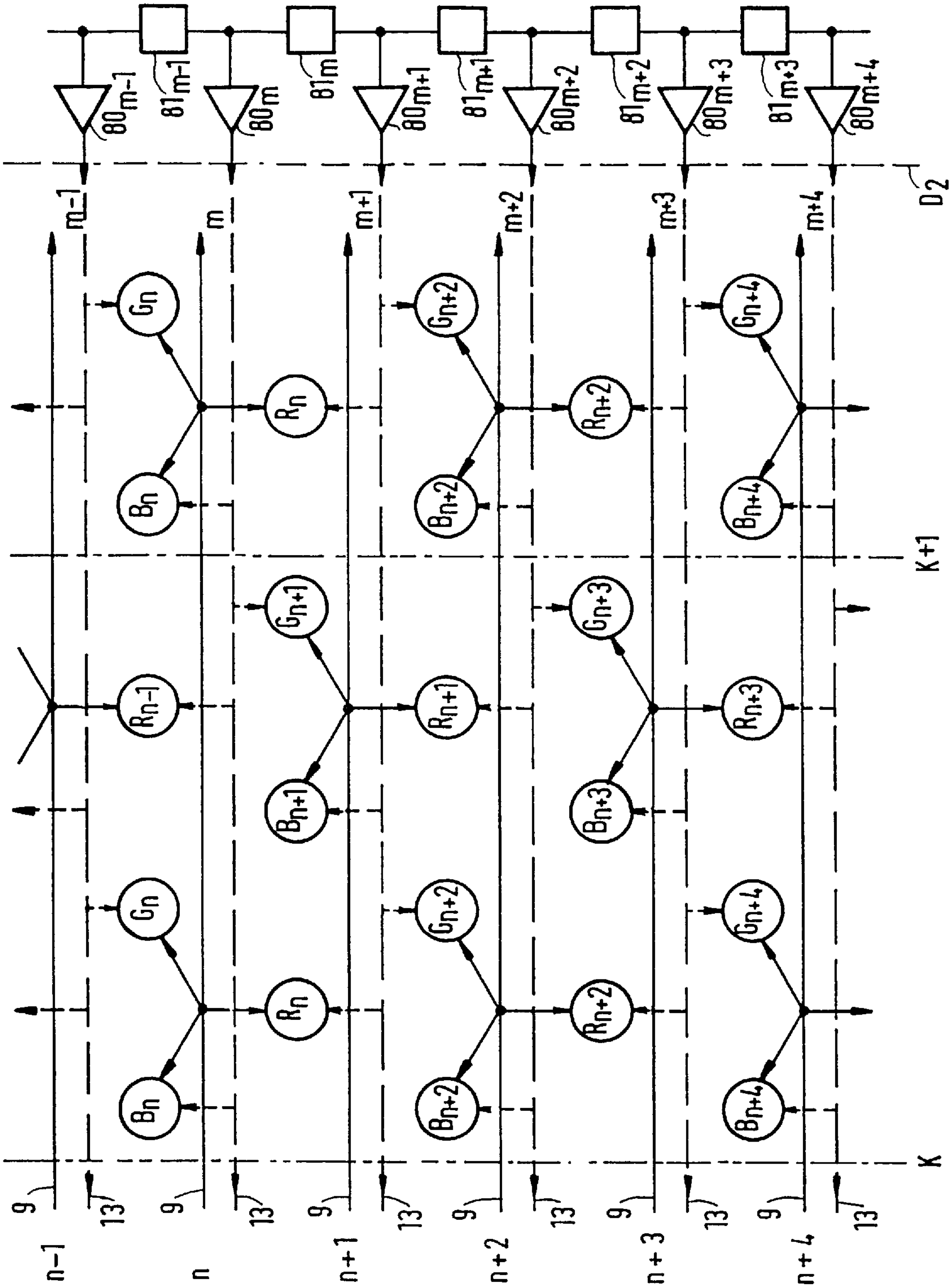
FIG. 4 shows a detail of an embodiment of a luminescent screen in which the invention can be used.

FIG. 4 shows diagrammatically a part of the display panel with blue, green and red color pixels B, G and R and the preselection electrodes 9 acting thereon are shown in solid lines and the color selection electrodes 13 are shown in broken lines. The references n−1, n, n+1, . . . denote the ordinal number of preselection electrodes, and the references m−1, m, m+1, . . . denote the ordinal number of the color selection electrodes.

Figure 5A:
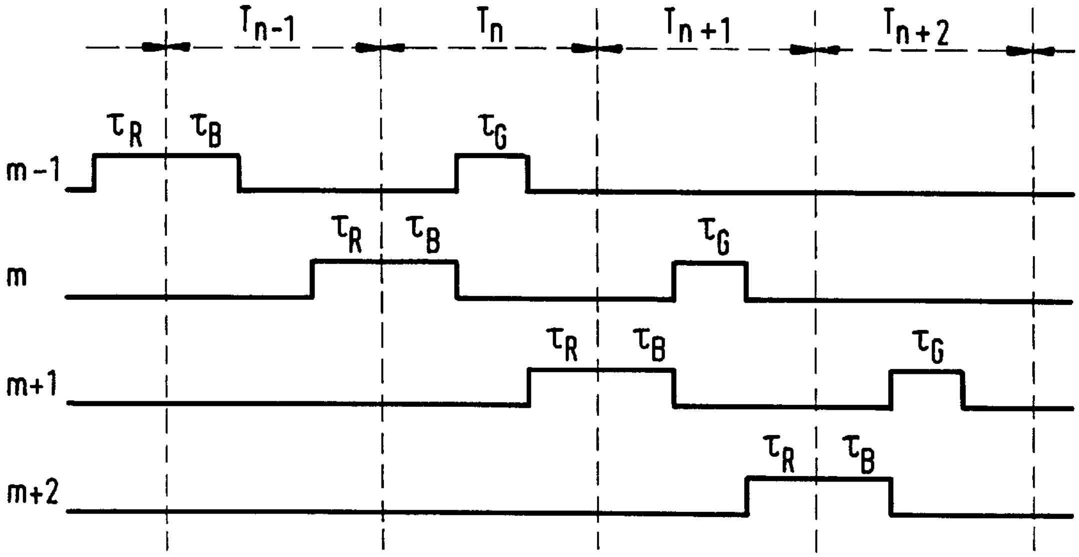
FIGS. 5A and 5B show time diagrams of color selection pulses and video signals in a color display device with a luminescent screen as shown in FIG. 4.

The vertical dot-and-dash lines k, k+1, . . . denote the electron transport ducts (the compartments 6, 6', 6", . . . ), while the color pixels located between two adjacent dot-and-dash lines are excited by one compartment. A triplet of color pixels $B_n$, $G_n$, and $R_n$ arranged in a triangle is selected during the preselection period $T_n$ (see FIG. 5) by the preselection electrode of ordinal number n. A second triplet of color pixels $B_{n+1}$, $G_{n+1}$, $R_{n+1}$ is selected during the preselection period $T_{n+1}$ by the preselection electrode of ordinal number n+1, and so forth. The color selection electrode of ordinal number m selects the red color pixel $R_{n-1}$ of the triplet preselected by the preselection electrode having ordinal number n−1, the blue color pixel $B_n$ of the triplet preselected by the preselection electrode of ordinal number n, and the green color pixel $G_{n+1}$ of the triplet preselected by the preselection electrode of ordinal number n+1. FIG. 5A shows the color selection pulses applied by the driver D2 to the color selection electrodes for the case where the three color selection time fractions have an equal duration. The color selection electrode of ordinal number m receives a (double) color selection pulse during the last part of the preselection period $T_{n-1}$ so that the red color pixel $R_{n-1}$ luminesces, and during the first part of the preselection period $T_n$ so that the blue color pixel $B_n$ luminesces, and a (single) color selection pulse during the central part of the preselection period $T_{n+1}$ so that the green color pixel $G_{n+1}$ luminesces. Similarly, the color pixels located between the vertical dot-and-dash lines k and k+1 are selected. The selection of the color pixels driven by the other electron transport ducts is effected simultaneously and equally as the described selection of the color pixels located between the lines k and k+1; this is shown in FIG. 4 by means of the color pixels located to the right of line k+1.

Figure 5B:
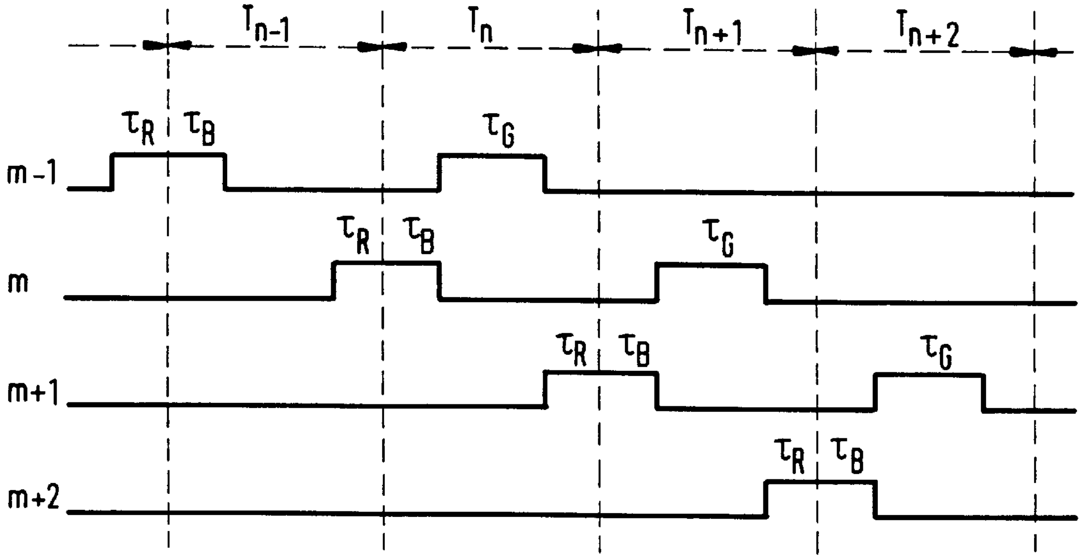

FIG. 5B shows the color selection pulses which are applied to the color selection electrodes for the case where the blue, green and red color selection time fractions are in a ratio of 1:2:1. In this case, the color selection electrode m receives a double color selection pulse during the last quarter of the preselection period $T_{n-1}$, in which the red color pixel $R_{n-1}$ luminesces, and during the first quarter of the preselection period $T_n$ in which the blue color pixel $B_n$ luminesces, as well as a second double color selection pulse during the second and third quarters of the preselection period $T_{n+1}$ in which the green color pixel $G_{n+1}$ luminesces, viz. twice as long as the separate red and blue color pixels.

It is to be noted that in the configuration of FIG. 4, each color selection electrode thus does not only serve for the selection of color pixels having a given color but, in cooperation with the selection by the preselection electrodes, also realizes the selection of the other colors. In this way, the number of required color selection electrodes can be decreased by a factor of 3.

In order to reduce the number of external connections to the driver D2 and the number of output stages in this driver, certain groups of color selection electrodes may be interconnected. An example for a display panel with 384 lines, hence 384 preselection electrodes and 384 color selection electrodes may be as follows:

| Ordinal number of the selection electrode | External connection |
|---|---|
| 1, 17, 33, 49, 65, 81, 97, 113 | > connection 1 |
| 2, 18, . . . , 114 | > connection 2 |
| 3, 19, . . . , 115 | > connection 3 |
| . | . |
| . | . |
| . | . |
| 16, 32, . . . , 128 | > connection 16 |

128 color selection electrodes are thus combined to 16 groups of 8 color selection electrodes each with 16 external connections. This scheme is repeated twice for the further color selection electrodes so that 3*128 color selection electrodes result in 3*16=48 external connections. Other schemes for reducing the number of external connections to the driver D2 are possible.

FIG. 4 shows, in a block diagram, the construction of the color selection driver D2 with a driver output stage $\mathbf{80}_{m-1}$, $\mathbf{80}_{m}$, $\mathbf{80}_{m+1}$, . . . for each color selection electrode, which output stages are controlled from branches of a shift register comprising a cascade of delay stages $\mathbf{81}_{m-1}$, $\mathbf{81}_{m}$, $\mathbf{81}_{m+1}$, . . . . In FIG. 5A, each stage 81 delays three clock pulse periods (=one preselection period T) and a bit pattern 110001 preceded and followed by zeros is applied to the cascade of delay times. In FIG. 5B, each stage 81 delays four clock pulse periods (=one preselection period T) and a bit pattern 11000011 preceded and followed by zeros is applied to the cascade. If, as described above, a number of (for example, 8) color selection electrodes is interconnected, such a bit pattern should be repeated by said number of times during a frame period.

We claim:

1. A color display device provided with a luminescent screen having different color pixels (R, G, B), electron sources for generating electron currents modulated with video information and a selection structure for sequentially directing each electron current to the different color pixels during color selection time fractions ($\tau_B$, $\tau_G$, $\tau_R$) determined by color selection pulses applied to the selection structure, characterized in that in order to reduce a maximum electron current requirement, the color selection time fractions ($\tau_B$, $\tau_G$, $\tau_R$) for the different color pixels are mutually essentially different in such a way that the color selection time fraction for the color pixels which require the largest quantity of electrons for displaying maximum white is longer than the color selection time fraction for the color pixels which require the smallest quantity of electrons for displaying maximum white.

2. A color display device as claimed in claim 1, characterized in that the color selection time fractions ($\tau_B$, $\tau_G$, $\tau_R$) for the different color pixels are in an integral ratio with respect to each other.

3. A color display device as claimed in claim 2, having blue, green and red color pixels, characterized in that the color selection time fractions ($\tau_B$, $\tau_G$, $\tau_R$) for the blue, green and red color pixels are in a ratio of 1:2:1.

* * * * *